Dec. 10, 1963  A. BAICKER  3,113,335
OUTDOOR BARBECUE GRILL-TOP CLEANER WITH INTERCHANGEABLE HEAD
Filed Sept. 17, 1962  3 Sheets-Sheet 1
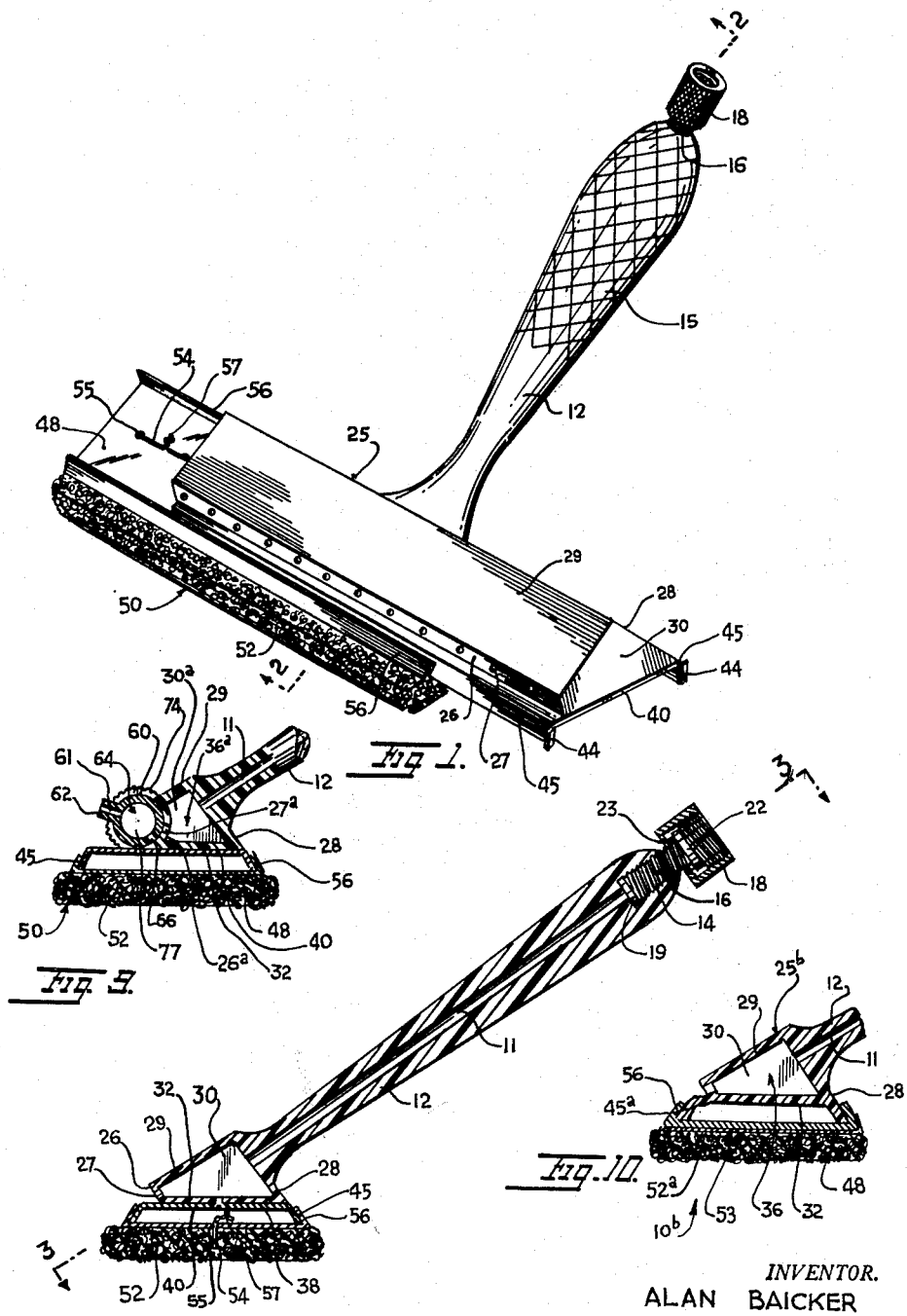
INVENTOR.
ALAN BAICKER
BY
ATTORNEY Dec. 10, 1963  A. BAICKER  3,113,335
OUTDOOR BARBECUE GRILL-TOP CLEANER WITH INTERCHANGEABLE HEAD
Filed Sept. 17, 1962  3 Sheets-Sheet 2
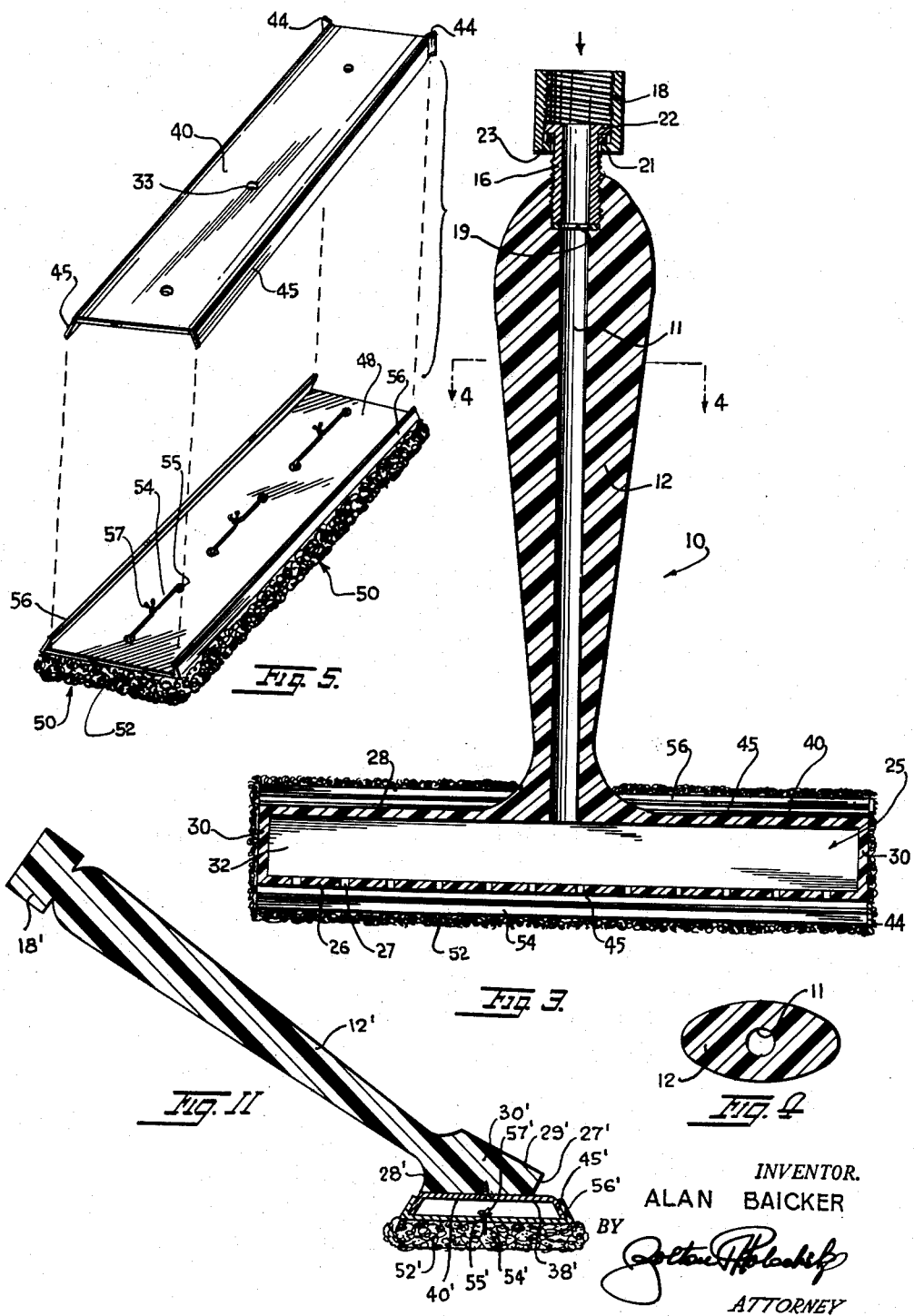
INVENTOR.
ALAN BAICKER
BY
ATTORNEY Dec. 10, 1963 A. BAICKER 3,113,335
OUTDOOR BARBECUE GRILL-TOP CLEANER WITH INTERCHANGEABLE HEAD
Filed Sept. 17, 1962 3 Sheets-Sheet 3
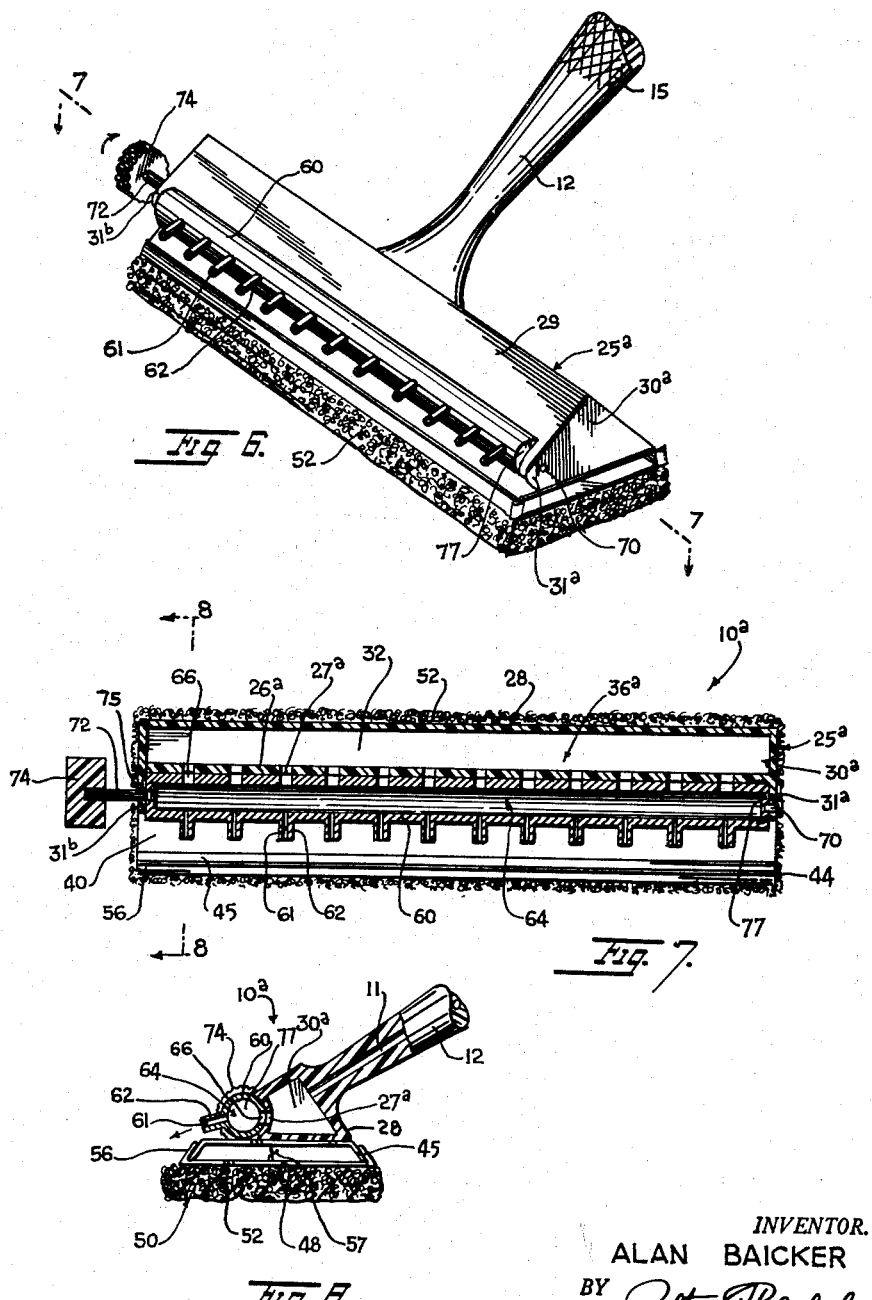
INVENTOR.
ALAN BAICKER
ATTORNEY

United States Patent Office 3,113,335
Patented Dec. 10, 1963

3,113,335
OUTDOOR BARBECUE GRILL-TOP CLEANER WITH INTERCHANGEABLE HEAD
Alan Baicker, 1978 Nantucket Road, Merrick, N.Y.
Filed Sept. 17, 1962, Ser. No. 223,901
2 Claims. (Cl. 15—544)

This invention relates to a cleaning appliance and more particularly concerns a holder with a removable scouring element.

According to the invention there is provided a holder including a handle at one end of which is a hollow crosshead supporting a first channel plate. A scouring element including another channel plate is removably mounted on the first channel plate. The handle has a bore communicating with the interior of the crosshead. A plurality of holes are provided in one side of the bar opening into the interior of the crosshead. A fitting or coupling is provided at the other end of the bore in the handle for attachment of a threaded fitting at one end of a hose. Water can be supplied to the appliance through the bore in the handle and interior of the crosshead. The water will leave the crosshead as a spray through the holes in the side wall of the bar. The scouring element includes a steel wool pad, sponge or other fibrous, porous cleaning element. The pad may be impregnated with a suitable detergent. The appliance will be used by manual manipulation over a surface to be cleaned. The water will be turned on and off as needed. When desired, the scouring element can be removed and interchanged for another.

In the preferred form of the invention the crosshead is provided with a rotatable valve member having a plurality of nozzles for directing the water spray in different directions and for shutting off the water spray when desired.

It is therefore a principal object of the invention to provide a cleaning appliance having a handle and attached crosshead, with a scouring element removably mounted on the crosshead, and means for supplying a spray of water for washing a surface.

Another object is to provide a novel scouring element for a cleaning appliance.

A further object is to provide an appliance as described wherein the handle has an axial bore and the crosshead is hollow to define a cavity communicating with the bore, the crosshead having holes in one side to release a spray of water therethrough.

Another object is to provide an appliance as described, wherein the crosshead has a rotatable valve member with nozzles for directing the spray in different directions or for shutting off the spray.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a perspective view of an appliance embodying the invention.

FIG. 2 is a longitudinal sectional view of the appliance, taken on line 2—2 of FIG. 1.

FIG. 3 is a longitudinal sectional view on the enlarged scale taken on line 3—3 of FIG. 2.

FIG. 4 is a cross-sectional view taken on line 4—4 of FIG. 3.

FIG. 5 is an exploded perspective view of parts of the scouring element employed in the appliance.

FIG. 6 is a perspective view of another appliance embodying the invention, parts being broken away.

FIG. 7 is a cross-sectional view taken on line 7—7 of FIG. 6.

FIG. 8 is a cross-sectional view taken on line 8—8 of FIG. 7 showing a valve member thereof in one position.

FIG. 9 is a sectional view similar to FIG. 8 showing the valve member in another position.

FIG. 10 is a cross-sectional view similar to part of FIG. 2 showing another crosshead construction.

FIG. 11 is a view similar to FIG. 2, showing another form of the invention.

Referring first to FIGS. 1-5 there is shown a nonelected embodiment of the cleaning and scouring device 10 including an elongated cylindrical plastic handle 12 having a central bore 11. At the distal end of the handle in bore 11 is a threaded recess 14 which receives a fitting 16 engaging an internally threaded coupling sleeve or nut 18. A washer 19 is inserted between the inner end of the fitting and the inner end of recess 14. Another washer 21 is inserted between annular flange 22 at the outer end of fitting 16 and annular flange 23 at the inner end of coupling sleeve 18. The coupling sleeve or nut 18 can be screwed on to a threaded fitting at the end of a water hose for supplying water to the device. The handle is elliptical in cross section and scored at 15 to be conveniently held in the hand.

The handle is integrally secured at its other end to a plastic hollow crosshead 25. This crosshead is generally trapezoidal in cross section with a narrow forward edge or wall 26, a wider rear wall 28 from which the handle extends, top wall 29, trapezoidal end walls 30 and a flat rectangular bottom wall 32. The walls of the crosshead defines an elongated chamber 36 extending the full length of the interior of the crosshead. Bore 11 opens into and communicates with chamber 36 at the center of rear wall 28.

Secured to the underside of the flat bottom 32 by fasteners such as screws 38 is a channel plate 40. This channel plate has a flat rectangular body with two opposing narrow flanges 45 at its lateral edges bent outwardly and downwardly at obtuse angles to the plate. At one end of each flange 45 is a tab 44 extending laterally outward of the flange. Holes 33 in the plate receive screws 38 seated in the underside of bottom wall 32.

Removably engaged with the channel plate 40 is a channel plate 48 of a cleaning and scouring element 50. This element includes an elongated rectangular pad 52 of steel wool secured to the underside of the channel plate 48. Instead of steel wool, stiff bristles can be attached to plate 48. The steel wool is shown attached to the plate by loops of wire 54 extending through holes 55 in the plate and twisted together at their ends 57 on the upper side of the plate. The plate has at its lateral edges two opposing flanges 56 bent inwardly at acute angles to the upper side of the plate. These flanges slidably engage the flanges 45 of plate 40 when the cleaning element is inserted on the plate. The tabs 44 serve as stop members to limit movement of the channel plate 50 along plate 40.

Front wall 26 of the crosshead has a series of spaced holes 27 which communicate with the interior chamber 36 in the crosshead. Thus water which enters the chamber 36 from bore 11 leaves the chamber through holes 27 in finely divided streams as a spray. The water spray is deposited on the surface to be cleaned in advance of the cleaning pad 52 and thoroughly moistens this surface for thorough cleaning.

In FIGS. 6-9 is shown another cleaning device 10a including the preferred embodiment of the invention. Device 10a is similar to device 10 and corresponding parts are identically numbered. The device has plastic handle 12 integral with plastic crosshead 25a. This crosshead has a cylindrically curved front wall 26a with its concave side at the forward end of the crosshead. The end walls 30ª of the crosshead extend forwardly to define bearing ears 31ª, 31ᵇ for a cylindrical valve member 60. This member has a series of spaced short nozzles 62 extending radially outwardly of the valve member. The bores 61 in the nozzles communicate with the cavity or chamber 64 in the valve member. A series of axially spaced circumferentially slotted holes 66 are provided in the valve member circumferentially spaced from bores 61 of the nozzles; see FIGS. 7–9. These holes 66 register with similarly spaced holes 27ª formed in the front wall 26ª of the crosshead. One end of the valve member is journalled by a pintle 70 in ear 31ª. The other end of the valve member has a stub shaft 72 which extends through hole 75 in ear 31ᵇ. A knob 74 is secured to the outer end of shaft 72. The cylindrical valve member has closed circular ends 77.

FIGS. 8 and 9 show that the valve member can be rotated angularly from one position where holes 66 and 27ª are in registration so that direct passages for water exist from chamber 36ª to chamber 64 and out through the nozzles. The nozzles can be slightly elevated by turning the valve member to direct the nozzles angularly upward. This will produce a further throw of the water spray. Further clockwise turning of the valve member as viewed in FIG. 8 will position the imperforate portion of the valve wall against the holes 27ª and block them so that the water spray will be cut off. Thus the rotatable valve member can be rotated to change the forward direction of the water spray and to cut off the water spray when desired.

If the cleaning pad 52 is made of steel wool, this pad may be impregnated with a suitable detergent. Instead of being wired to the plate 48 it can be secured by cement, rivets or other fastening means. The channel plate 40 can be permanently secured to the underside of wall 32 by rivets, cement or other fastener means than screws 38.

FIG. 10 shows another non-elected embodiment comprising cleaning device 10ᵇ with a crosshead 25ᵇ in which depending flanges 45ª are integrally formed with the underside of bottom wall 32 of the crosshead. These flanges extend at obtuse angles to the bottom wall 32 and define therewith a channel which removably receives the channel plate 48. Flanges 56 of the plate 48 slide along the flanges 45ª the plate being mounted on and removed from the crosshead 25ᵇ. The cleaning and scouring pad 52ª is shown in FIG. 10 secured by a layer of cement 53 to plate 48 in place of the wire loops 54.

In FIG. 11 a solid handle 12′ is shown with a solid crosshead 25′. This non-elected form of the invention may be used without the use of any water supply connection. In other respects, this form of the invention is similar to the previous forms and the various parts may be recognized by similar reference numerals with a prime added.

The appliance described facilitates cleaning grills, grates and other cooking utensils, barbecue pits, and other cooking appliances which normally are most difficult to clean by ordinary cleaning means.

The cleaning devices can be relatively inexpensively manufactured by mass production metal and plastic working machinery. They are durable and long lasting in construction.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim is new, and desire to secure by United States Letters Patent is:

1. A cleaning appliance, comprising a hollow handle, a hollow crosshead integrally joined to the handle, said crosshead having walls defining a substantially closed chamber, said handle having an axial bore communicating with said chamber for passing water from a supply thereof into said chamber, one of said walls having a series of holes therein providing a plurality of outlets for water from the chamber, said crosshead having a substantially flat bottom wall, and a cleaning element removably mounted at the bottom wall of said crosshead, said one wall of the crosshead being cylindrically curved, a rotatable elongated valve member abutting said one wall, said valve member having longitudinally spaced other holes registering with the holes in said one wall in one position of the valve member, said holes disposed over said cleaning element, and an imperforate portion of said valve member blocking the holes in said one wall in another angular position of rotation of said valve member, said valve member having a series of further holes circumferentially spaced from said other holes, whereby water is discharged from the valve member in a water spray through said further holes when water is admitted to the valve member through the holes in said one wall and the registering other holes in the valve member, said valve member being a cylindrical tube closed at opposite ends thereof, and integral nozzles extending radially of said tube at said further holes for directing the water spray in desired directions in different positions of rotation of said valve member.

2. A cleaning appliance, comprising a hollow handle, a hollow crosshead integrally joined to the handle, said crosshead having walls defining a substantially closed chamber, said handle having an axial bore communicating with said chamber for passing water from a supply thereof into said chamber, one of said walls having a series of holes therein providing a plurality of outlets for water from the chamber, said crosshead having a substantially flat bottom wall, means for removably mounting a cleaning element at said bottom wall, said one wall of the crosshead being cylindrically curved, a rotatable elongated valve member abutting said one wall, said valve member having longitudinally spaced other holes registering with the holes in said one wall in one position of the valve member, said holes disposed over said cleaning element, and an imperforate portion of said valve member blocking the holes in said one wall in another angular position of rotation of said valve member, said valve member having a series of further holes circumferentially spaced from said other holes, whereby water is discharged from the valve member in a water spray through said further holes when water is admitted to the valve member through the holes in said one wall and the registering other holes in the valve member, said valve member being a cylindrical tube closed at opposite ends thereof, and integral nozzles extending radially of said tube at said further holes for directing the water spray in desired directions in different positions of rotation of said valve member.

References Cited in the file of this patent
UNITED STATES PATENTS

| | | |
|---|---|---|
| 2,533,706 | Acocella et al. | Dec. 12, 1950 |
| 2,601,689 | Mallard | July 1, 1952 |
| 2,742,660 | Van Esley | Apr. 24, 1956 |
| 2,990,564 | Sweeney et al. | July 4, 1961 |